United States Patent
Brandyberry et al.

(10) Patent No.: US 7,594,144 B2
(45) Date of Patent: Sep. 22, 2009

(54) HANDLING FATAL COMPUTER HARDWARE ERRORS

(75) Inventors: Mark A. Brandyberry, Austin, TX (US); Shiva R. Dasari, Austin, TX (US); Daniel E. Hurlimann, Austin, TX (US); Bruce J. Wilkie, Georgetown, TX (US); Lee H. Wilson, Austin, TX (US); Christopher L. Wood, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 11/464,364

(22) Filed: Aug. 14, 2006

(65) Prior Publication Data

US 2008/0126852 A1 May 29, 2008

(51) Int. Cl.
*G06F 11/00* (2006.01)
(52) U.S. Cl. .............................. 714/43; 714/34; 714/44
(58) Field of Classification Search .................. 714/34, 714/43, 44, 48; 710/48
See application file for complete search history.

(56) References Cited

U.S. PATENT DOCUMENTS

| | | |
|---|---|---|
| 5,544,329 A | 8/1996 | Engel et al. |
| 5,581,244 A | 12/1996 | Jokimies et al. |
| 5,812,607 A | 9/1998 | Hutchinson, IV et al. |
| 5,892,956 A | 4/1999 | Qureshi et al. |
| 5,999,969 A | 12/1999 | Holmes et al. |
| 6,205,508 B1 | 3/2001 | Bailey et al. |
| 6,647,440 B1 | 11/2003 | Birns et al. |
| 6,665,752 B1 | 12/2003 | Bernath et al. |
| 6,889,247 B2 | 5/2005 | Christie et al. |
| 7,010,630 B2 * | 3/2006 | Pagan ........................ 710/100 |
| 2006/0150009 A1* | 7/2006 | Takemori ..................... 714/12 |
| 2007/0043975 A1* | 2/2007 | Varadarajan et al. .......... 714/25 |
| 2007/0088816 A1* | 4/2007 | Hrustemovic et al. ....... 709/224 |
| 2007/0088988 A1* | 4/2007 | Gupta et al. .................. 714/48 |
| 2008/0256400 A1* | 10/2008 | Yang et al. .................... 714/57 |

FOREIGN PATENT DOCUMENTS

| | | |
|---|---|---|
| JP | 8016420 A | 1/1996 |
| WO | WO 98/48346 A2 | 10/1998 |

* cited by examiner

*Primary Examiner*—Robert Beausoliel
*Assistant Examiner*—Philip Guyton
(74) *Attorney, Agent, or Firm*—H. Artoush Ohanian; Cynthia G. Seal; Biggers & Ohanian, LLP.

(57) ABSTRACT

Methods and apparatus are disclosed for handling fatal computer hardware errors on a computer that include halting data processing operations of the computer upon occurrence of a fatal hardware error; signaling by a source chip of a chipset to the programmable logic device the occurrence of a fatal hardware error; signaling by the programmable logic device to an embedded system microcontroller the occurrence of a fatal hardware error; reading by the embedded system microcontroller through at least one sideband bus from registers in chips of the chipset information regarding the cause of the fatal hardware error; and storing by the embedded system microcontroller the information in non-volatile random access memory of the embedded system microcontroller.

24 Claims, 2 Drawing Sheets

HANDLING FATAL COMPUTER HARDWARE ERRORS

BACKGROUND OF THE INVENTION

1. Field of the Invention

The field of the invention is data processing, or, more specifically, methods, systems, and products for handling fatal computer hardware errors.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas of computer technology that has seen considerable advancement is the handling of fatal computer hardware errors. A hardware error is a behavior related to a malfunction of a hardware component in a computer system. The hardware components, typically chips in a chipset, contain error detection mechanisms that can detect when a hardware error condition exists.

A chipset is a group of integrated circuits ('chips') that are designed to work together, often marketed as a single product. The manufacturer of a chipset can be, and often is, independent from the manufacturer of the motherboard. Examples of motherboard chipsets include NVIDIA's nForce chipset and VIA Technologies' KT800, both for AMD processors, or one of Intel's many chipsets. When discussing personal computers based on contemporary Intel Pentium-class systems, the term 'chipset' often refers to the two main bus adapters, the Northbridge and the Southbridge. In computer technology generally, the term 'chipset' is often used to refer to the specialized motherboard chips on a computer or expansion card. The term "chipset" was also widely used in the 1980s and 1990s for the custom audio and graphics chips in home computers, games consoles and arcade game hardware of the time. Examples include the Commodore Amiga's Original Chip Set or SEGA's System 16 chipset. In this paper, the term 'chipset' is used to refer to principal integrated circuit components of a computer, including processors, memory modules, and bus adapters.

Computer systems produced since the late 1980s often share commonly used chipsets, even across widely disparate computing specialties—for example, the NCR 53C9x, a low-cost chipset implementing a SCSI interface to storage devices and the like, could be found not only in Unix machines (such as the MIPS Magnum), but also in embedded devices and personal computers.

The story of modern servers is as much the story of specialized chipsets as it is the story of specialized processors and motherboards. The chipset tends to imply the motherboard; therefore, any two server boards with the same chipsets typically are functionally identical unless a vendor adds features to those provided by the chipset or removed support for certain chipset features. Vendors might, for example, add additional chips to support additional features, such as a second 10 Mbps Ethernet, 100 Mbps Fast Ethernet, or 1000Mbps Gigabit Ethernet port.

The chipset typically contains the processor bus adapter, often referred to as the 'front-side bus,' memory controllers, I/O controllers, memory modules, and more. Memory controllers may be integrated into a bus adapter. The AMD Opteron processors for servers and workstations, for example, incorporate memory controllers; chipsets that support Opteron processors (or other chipsets that integrate memory controllers into a bus adapter), therefore, typically do not contain separate memory controller chips.

In a typical server, all the principal integrated circuits on the motherboard are contained within the chipset. In a typical computer, chips of a chipset implement connections between processors and everything else. In most cases, the processors cannot communicate with memory modules, adapter boards, peripheral devices, and so on, without going through other chips of a chipset.

Although server chipsets are designed to perform the same types of tasks as desktop chipsets, the feature set included in a typical server chipset emphasizes stability rather than performance, as with a typical desktop chipset. Server-specific chipset features such as support for error-correcting code ('ECC') memory, advanced error correction for memory, system management, and a lack of overclocking options demonstrate the emphasis on stability.

Components of a computer traditionally concerned with hardware errors include interrupt handler modules in firmware or in an operating system. Firmware is computer system-level software module stored in non-volatile memory so as to be available to run promptly when power is first applied to the computer, before the operating system is booted. Firmware provides boot routines, hardware error handling routines, and certain low-level I/O routines. A very common example of firmware is the so-called Basic Input-Output System ('BIOS'). In a traditional architecture for handling computer hardware errors, a chip, upon detecting an error in chip operations, signals an error by throwing an interrupt on a hardwired interrupt signal line to a programmable interrupt controller. The programmable interrupt controller then signals a processor of the interrupt, and the processor vectors the interrupt to an interrupt handling routine (called an 'interrupt handler') in BIOS or in the operating system.

Interrupts thrown as a result of hardware errors may be correctable, either by the hardware itself, or by a BIOS or operating system error handler, or by a user-level application routine registered with the operating system as an exception handler. Hardware errors can be classified as either corrected errors, or uncorrected errors. A corrected error is a hardware error condition that has been corrected by computer hardware or by computer firmware by the time the operating system is notified about the existence of the error condition. An uncorrected error is a hardware error condition that cannot be corrected by the hardware or by the firmware. Uncorrected errors are either fatal or non-fatal. A fatal hardware error is an uncorrected or uncontained error condition that is determined to be unrecoverable by the hardware. When a fatal uncorrected error occurs, the system is halted to prevent propagation of the error. A non-fatal hardware error is an uncorrected error condition from which the operating system can attempt recovery by trying to correct the error. Examples of hardware errors that can be fatal include divide-by-zero faults, bounds check faults, invalid opcode faults, memory segment overrun faults, invalid task state faults, stack faults, page faults, and others as known to those of skill in the art.

It is useful to distinguish the source of a hardware error report and the cause of the hardware error. A hardware error source is any chip that alerts the operating system to the presence of an error condition. Examples of hardware error sources include:

Processor machine check exception (for example, MC#)
Chipset error message signals (for example, SCI, SMI, SERR#, MCERR#)
I/O bus error reporting (for example, PCI Express root port error interrupt)
I/O device errors A single hardware error source might handle aggregate error reporting for more than one type of hardware error condition. For example, a processor's machine check exception typically reports processor errors, cache and memory errors, and system bus errors. Note that the system management interrupt ('SMI') is usually handled by firmware; the operating system typically does not handle SMI.

A hardware error source is typically represented by the following:

One or more hardware error status registers.
One or more hardware error configuration or control registers.
A signaling mechanism to alert the operating system to the existence of a hardware error condition.

In some situations, there is not an explicit signaling mechanism and the operating system must poll the error status registers to test for an error condition. However, polling can only be used for corrected error conditions since uncorrected errors require immediate attention by the operating system.

Traditionally, interrupts were provided to processors through sideband signals that were not mixed into in-band buses used for data moving and instruction fetching in the system. An 'in-band bus' is a bus that carries the computer program instructions and data for carrying out principal data processing on the computer—as distinguished from a 'sideband bus' that only carries instructions and data for service communications among peripheral service components of the computer and processors, memory, and other chips of a chipset. A more recent variation on this is that lower priority interrupts were handled as message interrupts, but very high priority interrupts such as SMI and NMI were still handled as sideband signals directly wired to a processor. As such, the highest priority interrupts (those involving unrecoverable errors) were guaranteed to be handled by the processor very quickly without data integrity exposures to the system.

Recently, many computer systems have begun using message interrupts for these high priority interrupts which are mixed in with the system's data and instruction buses, the in-band buses. This approach has some merits, but it opens data integrity holes due to the amount of time it takes for the high priority interrupt to reach the system and the fact that potentially corrupted data is flowing through the system while the enqueued messaged interrupt is making its way to the processor for service.

One traditional way of handling fatal computer hardware errors in systems that use messaged interrupts on in-band buses is to allow some unrecoverable I/O errors, such as, for example, PCI SERR, PERR, and target aborts, to be handled by system software in the form of an SMI or NMI handler. Other unrecoverable errors lead to operating system 'blue screens' because they immediately halt the system by causing an NMI or machine check. In such systems, the machine is typically left in the failed state, that is, frozen with a blue screen, for failure analysis until the computer is manually rebooted.

Another traditional way of handling fatal computer hardware errors in computers that use HyperTransport in-band buses is to design a system so that the system goes into HyperTransport sync flood on some or all unrecoverable errors. Such systems attempt to use so-called 'sticky bits' in registers that are used for the identification of unrecoverable errors. Such systems reboot the system on detecting HyperTransport sync flood and depend on the BIOS being able to run successfully after the reboot to read the sticky bits and diagnose the problem. Such systems may require an additional reboot so they can take action on what they learn from the sticky bits to configure the system for reliable operation after the failure.

Both of these traditional solutions require that the system processors be able to run on the file system either before or after the system is rebooted. There is always a risk on fatal hardware errors, however that the system will not reboot at all after the failure. In addition, the second solution regarding HyperTransport buses often requires that the system be rebooted more than once after the failure. This is very confusing to users who often interpret such additional reboots as the system 'thrashing' itself after a failure. In addition, some errors, such as multi-bit memory errors, link errors in HyperTransport buses, PCI errors, and the like, may be so severe as to cause a firmware or operating system interrupt handler to be unable to run at all. This means a fatal hardware error does not get logged and diagnosed in a detailed, meaningful fashion. All that is known is that the system crashed. Handling fatal hardware errors through firmware or operating system interrupt handlers therefore always bears at least some risk of data loss.

SUMMARY OF THE INVENTION

Methods and apparatus are disclosed for handling fatal computer hardware errors on a computer that include halting data processing operations of the computer upon occurrence of a fatal hardware error; signaling by a source chip of a chipset to the programmable logic device the occurrence of a fatal hardware error; signaling by the programmable logic device to an embedded system microcontroller the occurrence of a fatal hardware error; reading by the embedded system microcontroller through at least one sideband bus from registers in chips of the chipset information regarding the cause of the fatal hardware error; and storing by the embedded system microcontroller the information in non-volatile random access memory of the embedded system microcontroller.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, systems, and products for handling fatal computer hardware errors according to embodiments of the present invention are described with reference to the accompanying drawings, beginning with FIG. 1. A 'fatal computer hardware error,' as the term is used in this specification, is a hardware error that cannot be corrected by system hardware, interrupt handlers in firmware, interrupt handlers in an operating system, nor by any exception handler registered with the operating system by user-level application software. A fatal hardware error is an error condition that is determined by the hardware, a chip of a chipset in a computer, to be unrecoverable. So in this specification, the terms 'fatal hardware error' and 'unrecoverable hardware error' are used as synonyms. When a fatal hardware error occurs, normal data processing on the computer is halted to prevent propagation of the error and data corruption. Service processing by a programmable logic device and an embedded system microcontroller continues as described below.

Figure 1:
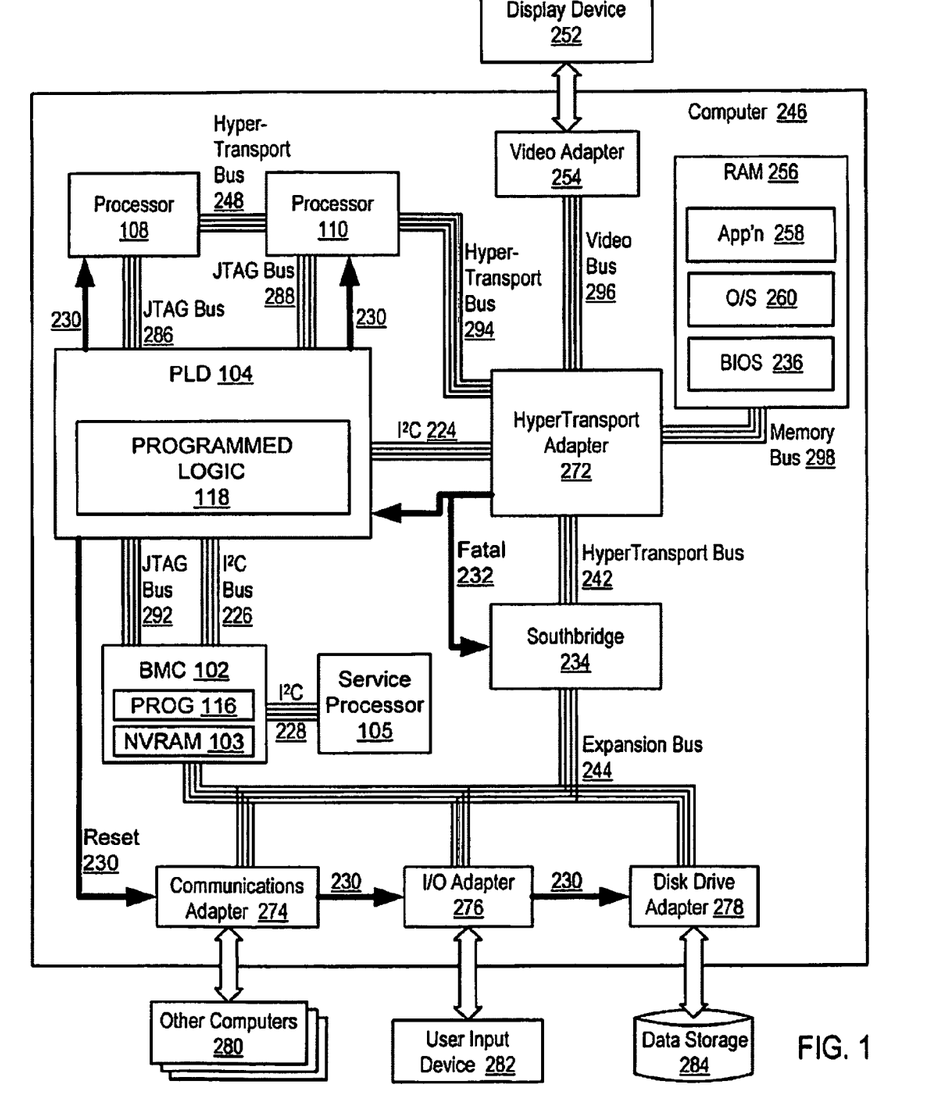
FIG. 1 sets forth a block diagram of an exemplary computer useful for handling fatal computer hardware errors according to embodiments of the present invention.

FIG. 1 sets forth a block diagram of an exemplary computer (246) useful for handling fatal computer hardware errors according to embodiments of the present invention. The computer (246) of FIG. 1 includes two computer processors (108, 110) or 'CPUs' as well as random access memory (256) ('RAM') which is connected through a high speed memory bus (298) and bus adapter (272) to the processors (108, 110) and to other components of the computer. RAM can be implemented in multiple memory modules such single in-line memory modules ('SIMMs') or dual in-line memory modules ('DIMMs'). Computer processors, memory modules implementing RAM, bus adapters, and other principal integrated circuit components of the example computer (246) are implemented as chips of a chipset. The chips of the chipset are communicatively connected through one or more in-band buses (248, 294, 242, 244). An in-band bus is a bus for communication of computer program instructions and computer program data for execution of application programs among processors, memory, and other chips of a chipset. Examples of in-band buses useful in computers that handle fatal hardware errors according to embodiments of the present invention are represented here by a HyperTransport bus (248, 294, 242) and an expansion bus (244). The expansion bus can be an ISA bus, a PCI bus, an Infiniband bus, or any other expansion bus as may occur to those of skill in the art. The use of two processors (108, 110) in this example is only for convenience of explanation; in fact, computers that handle fatal computer hardware errors according to embodiments of the present invention can have any number of processors.

The example computer of FIG. 1 includes a programmable logic device ('PLD') (104) that operates according to embodiments of the present invention to handle fatal computer hardware errors by signaling to an embedded system microcontroller the occurrence of a fatal computer hardware error. A PLD is an electronic component used to build digital circuits. Unlike a logic gate, which has a fixed function, a PLD has an undefined function at the time of manufacture. Before the PLD can be used in a circuit it must be programmed. Program code for such a PLD may be embodied in a computer program product for handling fatal computer hardware errors, and the computer program product may be disposed, transported, or transmitted on a signal bearing medium. The signal bearing medium may be a recordable medium such as an optical diskette, a magnetic disk, or a magnetic tape, or the signal bearing medium comprises a transmission medium, such as a computer network or a wireless medium. Examples of PLDs useful in apparatus for handling fatal computer hardware errors according to embodiments of the present invention include Complex Programmable Logic Devices ('CPLDs'), Field Programmable Gate Arrays ('FPGAs'), Programmable Array Logic ('PAL'), Application Specific Integrated Circuits ('ASICs'), embedded microcontrollers, and others as may occur to those of skill in the art.

The PLD (104) in this example is communicatively coupled through two sideband buses to chips of the chipset and to an embedded system microcontroller. A sideband bus is a bus for service communications among peripheral service components of the computer and processors, memory, and other chips of the chipset. Examples of sideband buses useful in computers that handle fatal hardware errors according to embodiments of the present invention include JTAG and other boundary scan buses, $I^2C$ buses VESA Display Data Channels (DDC) buses, the System Management Bus ('SMBus'), the Intelligent Platform Management Bus ('IPMB'), and others as may occur to those of skill in the art. $I^2C$ is a serial computer bus invented by Philips that is used to attach low-speed peripherals to a motherboard, embedded system, or cell phone. The name is an acronym for Inter-Integrated Circuit and is pronounced I-squared-C. $I^2C$ is the basis for the ACCESS.bus, the VESA Display Data Channel (DDC) interface, the System Management Bus (SMBus), and the Intelligent Platform Management Bus (IPMB, one of the protocols of IPMI).

'JTAG' is an acronym for Joint Test Action Group and is the name usually used to refer to the IEEE 1149.1 standard entitled Standard Test Access Port and Boundary-Scan Architecture. JTAG is a standard for test access ports used for testing printed circuit boards and components (including computer processors) using boundary scan. Boundary scan is a method for testing interconnects (thin wire lines) on printed circuit boards or sub-blocks inside of an integrated circuit. The boundary scan standard referred to as JTAG has been so widely adopted by electronic device companies all over the work that today 'boundary scan' and 'JTAG' are practically synonyms. In this specification, however, 'boundary scan' and 'JTAG' are not treated as synonyms. 'Boundary scan' as the term is used here refers to boundary scan operations generally, while 'JTAG' is used to refer to boundary scans according to the JTAG standard. That is, in this specification, JTAG is treated as an example of one kind of boundary scan, admittedly a widely used example, but nevertheless, just one example. The term 'boundary scan' includes not only JTAG, but also any kind of boundary scan that may occur to those of skill in the art.

The boundary scan architecture provides a means to test interconnects and clusters of logic, memories, and other circuit elements without using physical test probes. It adds one or more so called 'test cells' connected to each pin of a device that can selectively override the functionality of that pin. These cells can be programmed through a JTAG scan chain to drive a signal onto a pin and across an individual trace on the board. The cell at the destination of the board trace can then be programmed to read the value at the pin, verifying the board trace properly connects the two pins. If the trace is shorted to another signal or if the trace has been cut, the correct signal value will not show up at the destination pin, and the board will be known to have a fault.

When performing boundary scan inside integrated circuits, boundary scan latch cells, sometimes called 'test cells' or 'latch cells' or just 'latches,' are added between logical design blocks in order to be able to control them in the same manner as if they were physically independent circuits. For normal operation, the added boundary scan latch cells are set so that they have no effect on the circuit, and are therefore effectively invisible. Then when the circuit is set into a test mode, the latches enable a data stream to be passed from one latch to the next, serially, in a so-called 'scan chain.' As the cells can be used to force data into the board, they can set up test conditions. The relevant states can then be fed back into an external test system by clocking the data word back serially so that it can be analyzed. By adopting this technique, it is possible for a test system, including an embedded system microcontroller or BMC, to gain test access to a board or to internal logic in an integrated circuit such as a computer processor or computer memory module.

In this example, the PLO (104) is connected to processors (108, 110) and to the embedded system microcontroller (102) through ITAG buses (286, 288, 292), and the PLD (104) is connected to bus adapter (272) and to the embedded system microcontroller (102) through 12C buses (224, 226). The PLD (104) in this example also provides the capability of dynamic boundary scan test chain configuration and the ability to communicate with a single processor in a virtual chain of processors as described in more detail in copending U.S. patent application Ser. No. 11/464,393, entitled "Processor Fault Isolation," which is hereby incorporated by reference into this specification as though fully set forth herein. For fault isolation purposes after occurrence of a fatal hardware error, an embedded system microcontroller, represented here by Baseboard Management Controller ('BMC') (102), manipulates select lines (not shown in FIG. 1) to indicate which processor it wishes to interrogate. The PLD then connects the microcontroller's boundary sean signals (292) to those of the selected processor (108 or 110), in effect creating a boundary scan test chain containing only one processor. By repeating this process, each processor can be interrogated regardless whether any other processor has suffered a catastrophic failure. Also, this process eliminates the need for the microcontroller to place any processor's boundary scan port in BYPASS mode, thus reducing the size and complexity of the embedded system microcontroller's (102) control program. Alternatively, the PLD can use processors' presence signals (not shown in FIG. 1) to dynamically configure the processors as a boundary scan test chain—if a processor is present, it will be included in the chain. This eliminates the requirement for manual chain reconfiguration based on processor population changes. Override jumpers may be provided so that an installed processor, that is, a processor that senses as present, may be excluded from the chain at the behest of a tester. The PLD can configure the processors as a single boundary scan chain, based on their population, that is, based on which ones are sensed as present. When a fatal computer hardware error occurs, the PLD can break the single chain, signal the embedded system microcontroller (102), and await a processor selection from the embedded system microcontroller.

As mentioned, the embedded system microcontroller is represented in the example of FIG. 1 as a BMC (102). A BMC is a specialized microcontroller embedded on the motherboard of many computers, especially servers. The BMC is the intelligence in the Intelligent Platform Management Interface ('IPMI') architecture. The BMC manages the interface between system management software and platform hardware. System management microconttollers such as BMCs are small embedded devices that contain a small processor, a small quantity of memory (103) in which is stored a microcontroller control program (116), and one or more I/O pods. The BMC (102) in this example has I/O pods for a JTAG bus, for two I2C bus connections, and an expansion bus.

Different types of sensors built into a computer system that uses a BMC report to the BMC on parameters such as temperature, cooling fan speeds, power mode, operating system status, processor operations, and so on. The BMC monitors the sensors and can send alerts to a system administrator via the network if any of the parameters do not stay within preset limits, indicating a potential failure of the system. The administrator can also remotely communicate with the BMC to take some corrective action such as resetting or power cycling the system to get a hung operating system running again. These abilities save on the total cost of ownership of a system.

Physical interfaces to the BMC may include System Management Buses ('SMBs'), an RS-232 bus, address and data lines and an Intelligent Platform Management Bus ('IPMB'), that enables the BMC to accept IPMI request messages from other management controllers in the system. The BMC communicates with a BMC management utility ('BMU') on a remote client using IPMI protocols. The BMU is usually a command line interface ('CLI') application. The Intelligent Platform Management Interface (IPMI) specification defines a set of common interfaces to computer hardware and firmware which system administrators can utilize to monitor system health and manage the system.

IPMI operates independently of the operating system and allows administrators to manage a system remotely even in the absence of the operating system or the system management software, or even if the monitored system has not powered on. IPMI can also function when the operating system has started, and offers enhanced features when used with the system management software. IPMI enables sending out alerts via a direct serial connection, a local area network ('LAN') or a serial over LAN ('SOL') connection to a remote client. System administrators can then use IPMI messaging to query platform status, to review hardware logs, or to issue other requests from a remote console through the same connections. The standard also defines an alerting mechanism for the system to send a simple network management protocol ('SNMP') platform event trap ('PET').

The example computer of FIG. 1 also includes a service processor (105) connected to the BMC (102) through an I2C bus (228). Handling fatal computer errors according to embodiments of the present invention typically is carried out with the computer system halted for normal data processing. Only the sideband portions of the system are active. The system processor provides a remote-management medium that can function entirely without the operating system or system firmware of the computer. Service processors can function this way because they operate independently of the other processors in a computer, the processors used to carry normal data processing. In addition, they use their own custom firmware and can even use a separate power supply to enhance reliability. A system administrator or other users can communicate directly with a service processor through an out-of-band connection. The management tools, features, and client interfaces provided by service processors differ from one manufacturer to another. They can range in complexity from a simple Telnet console to a rich Web-browser environment. Service processors can also provide support through media that are more complex than serial ports, such as Transmission Control Protocol/internet Protocol (TCP/IP) on Ethernet. Service processors are typically integrated into system motherboards or add-in PCI adapters and, as mentioned, function separately from the system's other processors.

In the example computer of FIG. 1, an application program (258), a module of user-level computer program instructions, an operating system (260), and system firmware (236) are stored in RAM (256). The application program (258) is a module of user-level computer program instructions. Operating systems useful in computers that handle fatal computer hardware errors according to embodiments of the present invention include UNIX™, Linux™, Microsoft NT™, AIX™, IBM's i5/OS™, and others as will occur to those of skill in the art. The system firmware (236) is represented as a Basic Input/Output System or 'BIOS.' Application (258), operating system (260), and system firmware (236) in the example of FIG. 1 are shown in RAM (256), but many components of such software typically are stored in non-volatile memory also, for example, on a disk drive (284) or in EEPROM (electrically erasable programmable read-only memory) or 'Flash' memory.

The computer (246) of FIG. 1 includes a bus adapter (272), a computer hardware component that contains drive electronics for the high speed buses, the HyperTransport bus (294, 248, 242), the video bus (296), and the memory bus (298). Examples of bus adapters useful in computers that carry out handling fatal computer hardware errors according to embodiments of the present invention include the Intel Northbridge, the Intel Memory Controller Hub, and HyperTransport bus adapters. Bus adapter (272) is represented in this example as a HyperTransport adapter. The computer (246) of FIG. 1 includes an additional bus adapter (234) that provides drive electronics for an expansion bus (234). Examples of bus adapters that provide drive electronics for expansion buses include the Intel Southbridge, the Intel I/O Controller Hub, and HyperTransport adapters. Bus adapter (234) is represented in this example as a Southbridge. Examples of expansion buses useful in computers that handle fatal computer hardware errors according to embodiments of the present invention include Industry Standard Architecture ('ISA') buses and the family of Peripheral Component Interconnect ('PCI') buses, PCI, PCIE, and PCIX.

The HyperTransport bus (294, 248, 242) is a bus that complies with standards promulgated by The HyperTransport Technology Consortium. The HyperTransport bus (294, 248, 242) is a bidirectional serial/parallel high-bandwidth, low-latency computer bus that is very fast. HyperTransport buses, depending on the version, may run from 200 MHz to 2.6 GHz (compared to PCI at either 33 or 66 MHz). The HyperTransport bus (294, 248) is also a DDR or "Double Data Rate" bus, meaning it sends data on both the rising and falling edges of its bus clock signal. This allows for a maximum data rate of 5200 MTransfers/s per pair running at 2.6 GHz. The primary use for HyperTransport, and the way the HyperTransport bus (294, 248) is shown in the example computer of FIG. 1, is to replace the front-side bus, which is currently different for almost every computer. For instance, a Pentium cannot be plugged into a PCI bus. In order to expand the system the front-side bus must connect through adaptors for the various standard buses, like AGP or PCI. These are typically included in the respective controller functions, namely the Northbridge and Southbridge. A similar computer implemented with HyperTransport is more flexible, as well as being faster. A single PCI<–>HyperTransport adaptor chip will work with any HyperTransport enabled microprocessor and allow the use of PCI cards with these processors. For example, the NVIDIA nForce chipset uses HyperTransport to connect its north and south bridges. Because of their speed and flexibility, HyperTransport buses are preferred in computers that carry out handling fatal computer hardware errors according to embodiments of the present invention, but they are not a required element of the present invention. Other buses may be used, including, for example, the well-known shared bus architecture from Intel.

In the case of computers that use HyperTransport buses as in-band buses, on an unrecoverable error, HyperTransport-connected chips can be configured by register setting so that synchronization packets or 'sync' packets are sent on a failing HyperTransport link. Other HyperTransport connected chips can be configured by register settings to propagate sync floods seen on one of their links to the HyperTransport links they are connected to. If all HyperTransport chips are set to propagate sync floods then all of the system's HyperTransport buses will be in the sync flood state within nanoseconds of when an unrecoverable error occurs.

HyperTransport adapter (272) represents a chip of a chipset that is configured to operate as a 'source chip' by signaling to the PLD (104) the occurrence of an unrecoverable error. That is, adapter (272) can function as a 'source chip' in the sense that it can be the source of a signal that a fatal hardware error has occurred. In this example, the source chip (272) is connected to an in-band bus that supports messaged interrupts, that is, to a HyperTransport bus. Any chip connected to any link of the HyperTransport bus may cause data processing operations on the computer to halt by effecting a sync flood on the HyperTransport bus upon occurrence of a fatal hardware error. That is, for example, if processor (110) detects a fatal memory address error, processor (110) can sync flood the HyperTransport bus, thereby halting data processing operations on the computer. HyperTransport adapter (272) detects the sync flood on the HyperTransport bus, interprets the sync flood as representing the occurrence of a fatal computer hardware error, and uses the hardwired fatal error signal line (232) to notify the PLD (104) and the Southbridge of the fatal hardware error. The PLD then in turn can use the I²C sideband bus (226) to signal the occurrence of the fatal hardware error to the embedded system microcontroller (102). In this way, the embedded system microcontroller (102) is advised of the occurrence of a failure on an in-band bus, in this case a HyperTransport bus, with no need for the embedded system microcontroller (102) itself to be connected to the in-band bus. This system setup blocks all system data movement on an unrecoverable error and therefore terminates any data integrity exposures. All interrupts are also locked by the sync flood from propagating on the HyperTransport buses.

The embedded system microcontroller (102) then reads through a sideband bus from registers in chips of the chipset information regarding the cause of the unrecoverable error. In this example, the embedded system microcontroller (102) reads information regarding the cause of the fatal hardware error at least from registers on processor (110) through JTAG buses (292, 288). The embedded system microcontroller (102) can read information regarding the cause of the fatal error from registers in other chips also—because although processor (110) in this example detected the error and bus adapter (272) reported the error, it is likely that neither processor (110) nor bus adapter (272) actually caused the error. For useful diagnosis therefore, the embedded system microcontroller (102) may query register from multiple chips of the chipset. In this example, the system firmware/BIOS previously at boot time configured each HyperTransport connected chip to propagate sync flood to all other HyperTransport bus links it is connected to so that the chip doing HyperTransport error detection can reliably detect that sync flood has occurred.

The embedded system microcontroller (102) then stores the information regarding the cause of the fatal error in non-volatile random access memory (103) of the embedded system microcontroller—so that the information will be available for use in error diagnosis even after a reboot. The embedded system microcontroller (102) may also store the information regarding the cause of the unrecoverable error in a system error log and reboot the computer by the embedded system microcontroller. In such a system, it is the embedded system microcontroller (102) that controls the timing of the reboot, not the BIOS/firmware. The computer (246) in this example connects the processors (106, 110) and other system components (274, 276, 278) to PLD (104) by reset signal lines (230) so that the embedded system microcontroller (102) can use I2C signals (226) to instruct the PLD to reset individual components of the system or reboot the entire computer system. System firmware (236) can determine during reboot, in dependence upon the information regarding the cause of the fatal hardware error, whether the computer can successfully be returned to service after occurrence of a fatal hardware error.

The computer (246) of FIG. 1 includes a disk drive adapter (278) coupled through the expansion bus (244) and the bus adapter (272) to the processors (108, 110) and to other components of the computer (246). The disk drive adapter (278) connects non-volatile data storage to the computer in the form of the disk drive (284). Disk drive adapters useful in computers that handle fatal computer hardware errors according to embodiments of the present invention include Integrated Drive Electronics ('IDE') adapters, Small Computer System Interface ('SCSI') adapters, and others as will occur to those of skill in the art. In addition magnetic disk drives, non-volatile computer memory may be implemented as an optical disk drive, electrically erasable programmable read-only memory space (so-called 'EEPROM' or 'Flash' memory), battery-supported RAM drives, and so on, as will occur to those of skill in the art.

The example computer of FIG. 1 includes one or more input/output ('I/O') adapters (276). I/O adapters implement user-oriented input/output through, for example, software drivers and computer hardware for controlling output to display devices such as computer display screens, as well as user input from user input devices (282) such as keyboards and mice. The example computer of FIG. 1 includes video adapter (254), which is an example of an I/O adapter specially designed for graphic output to a display device (252) such as a display screen or computer monitor. Video adapter (254) is connected to the processors (108, 110) through a high speed video bus (296), bus adapter (272), and the HyperTransport bus (294, 248), which as noted above is also a high speed bus.

The computer of FIG. 1 includes a communications adapter (274) for data communications with other computers (280). Such data communications may be carried out through serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that handle fatal computer hardware errors according to embodiments of the present invention include modems for wired dial-up communications, Ethernet (IEEE 802.3) adapters for wired data communications network communications, and 802.11b/g adapters for wireless data communications network communications.

Figure 2:
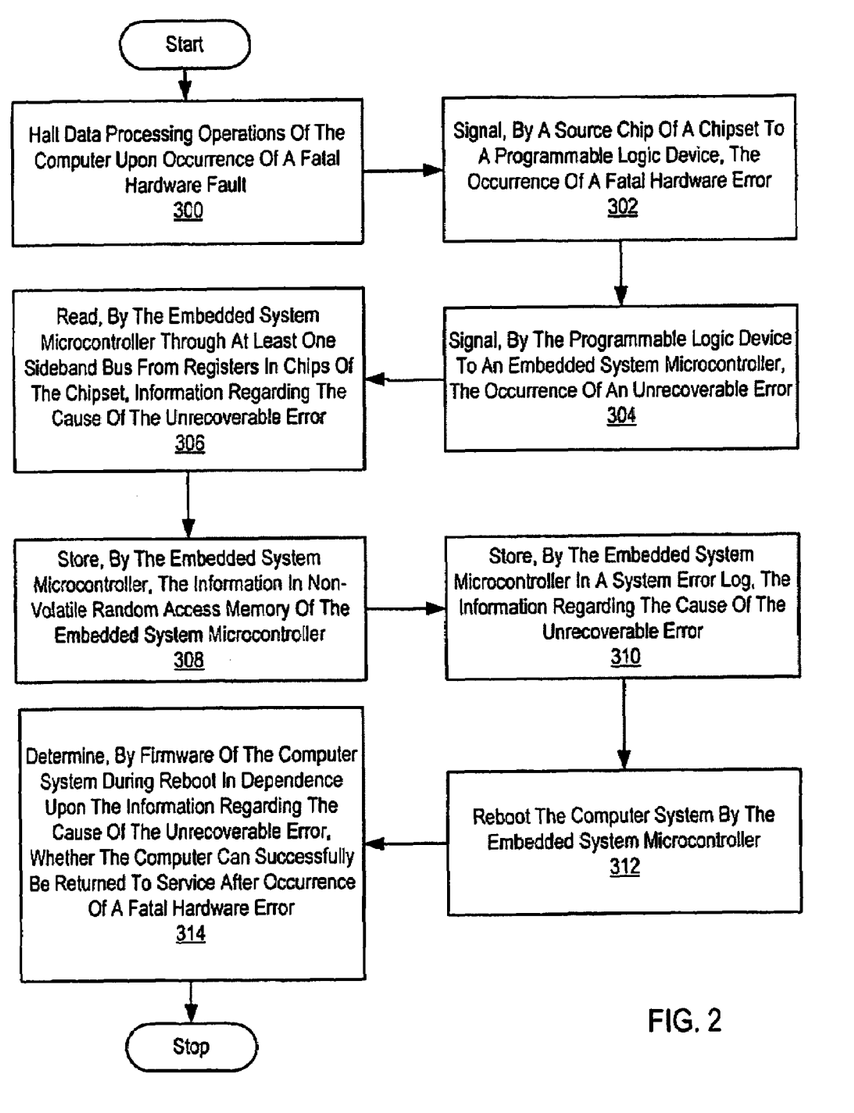
FIG. 2 sets forth a flow chart illustrating an exemplary method for handling fatal computer hardware errors according to embodiments of the present invention.

For further explanation, FIG. 2 sets forth a flow chart illustrating an exemplary method for handling fatal computer hardware errors according to embodiments of the present invention. The method of FIG. 2 is carried out under control of computer program instructions of an embedded system microcontroller and programmable logic of a programmable logic device ('PLD') in a computer that includes chips of a chipset, where the chips of the chipset are the principal integrated circuit components of the computer. The chips of the chipset are communicatively connected through one or more in-band buses, and the chips including at least one computer processor and at least one bus adapter. In addition, the computer includes a programmable logic device communicatively coupled through at least one sideband bus to chips of the chipset and to an embedded system microcontroller.

The in-band bus is a bus for communication of computer program instructions and computer program data for execution of application programs among processors, memory, and chips of the chipset. The in-band bus may be a HyperTransport bus, an Intel Frontside bus, a PCI bus, a PCI-E bus, a PCI-X bus, or the like. The sideband bus is a bus for service communications among peripheral service components of the computer and processors, memory, and chips of the chipset. The sideband bus may be a Joint Test Action Group ('JTAG') bus, an Inter-Integrated Circuit ('I$^2$C'), a VESA Display Data Channel ('DDC') interface, a System Management Bus ('SMBus'), an Intelligent Platform Management Bus ('IPMB'), or the like. The embedded system microcontroller may be a Baseboard Management Controller ('BMC').

The method of FIG. 2 includes halting (300) data processing operations of the computer upon occurrence of a fatal hardware fault. Any device on a link of a HyperTransport bus, for example, upon detecting a fatal hardware error on the link, may trigger a sync flood on the link. Another device on the same link may be configured to trigger a sync flood on a neighboring link, and so on, until the entire HyperTransport bus is in sync flood state, thereby halting data processing operations on the computer. Note that in a system that relies on bus messages for interrupts, this also effectively halts all interrupt activity, typically including interrupts that may signal fatal computer hardware errors. For a further example, a PCI adapter or a Southbridge or Northbridge that incorporates a PCI adapter, may, upon detecting a SERR or PERR error type on a PCI bus, lock the bus, thereby effectively halting further I/O data processing operations.

The method of FIG. 2 includes signaling (302) by a source chip of the chipset to the programmable logic device the occurrence of a fatal hardware error. The source chip is a chip that is the 'source' of a signal advising other chips of the occurrence of a fatal hardware error. The source chip is the chip that detects and reports the error condition—and may or may not be a chip whose failure caused the error condition. Possibly not all the chips in the chipset are configured to detect the error condition and signal the error condition. In the HyperTransport example, a bus that supports messaged interrupts, the source chip may be connected to the in-band HyperTransport bus along with several other chips who may be not configured to detect or signal error conditions although any of the chips may be a source of a fatal hardware error. One of the other chips, for example, one of the chips not configured to detect or signal fatal computer hardware errors may trigger a sync flood as a result of a hardware error, and, only when the sync flood reaches the source chip is the sync flood recognized as representing a fatal hardware error. The source chip may signal a PLD of the occurrence of a fatal hardware error through a hardwired signal line such as the one illustrated at reference (232) on FIG. 1.

The method of FIG. 2 includes signaling (304) by the PLD to the embedded system microcontroller the occurrence of a fatal hardware error. The PLD may signal the embedded system microcontroller of the occurrence of a fatal hardware error by use of a sideband signal through a sideband bus such as a JTAG bus or I$^2$C as shown at references (28, 226) on FIG. 1.

The method of FIG. 2 includes reading (306) by the embedded system microcontroller through at least one sideband bus from registers in chips of the chipset information regarding the cause of the fatal computer hardware error. Information regarding the cause of the fatal hardware error may include, for example:

Which memory modules have failed so that they can be fenced off.

Which processors failed and should not be setup for use at run time.

Which buses, HyperTransport, Infiniband, PCI, and the like, are damaged and cannot be used.

Which bus adapters, HyperTransport, Northbridge, Southbridge, PCI, PCI-X, PCI-E, and the like, have failed and cannot be used.

The method of FIG. 2 also includes storing (308), by the embedded system microcontroller, the information in non-volatile random access memory of the embedded system microcontroller. The method of FIG. 2 also includes storing (310), by the embedded system microcontroller in a system error log, the information regarding the cause of the fatal computer hardware error. The method of FIG. 2 also includes rebooting (312) the computer system by the embedded system microcontroller and determining (314) by firmware of the computer system during reboot, in dependence upon the information regarding the cause of the fatal hardware error, whether the computer can successfully be returned to service after occurrence of a fatal hardware error. On reboot, BIOS or other system firmware makes decisions on how to reconfigure the system so it can keep running until it receives service by reading the system failure/system status table provided by the BMC. So it is not necessary for chip vendors to implement sticky error bits in this scheme. It is also unnecessary for the BIOS to read bits to determine the system status. BIOS have available the information needed to determine whether or not it can bring up the system before it begins the reboot. If an error will stop the system from being brought up again, the BIOS will know at startup that it should not even try. Rather, it will signal users that the computer is out of service.

In view of the explanations set forth above in this paper, readers will recognize that handling fatal computer hardware errors according to embodiments of the present invention provides these benefits:

All fatal computer hardware error handling may be removed from the system firmware and from the operating system, the BIOS and operating system interrupt handlers. System management functions, a PLD, BMC, server processors, and the like, may handle all fatal hardware errors, and BIOS or other system firmware such as the BIOS can take action on the system management hardware/software's findings upon reboot.

Potential data integrity issues with systems that use messaged interrupts and try to use system software to diagnose fatal computer hardware errors are reduced or eliminated.

Fatal hardware errors are detected at the hardware level and system data processing is halted very quickly after a fatal error occurs, not requiring lengthy timeouts to determine that a fatal error has occurred.

Defines an overall set of system structures, configurations, and requirements that will allow a BMC to detect and record fatal computer hardware errors while the system is completely halted without having to run any system code. It is done completely by systems management code running on a BMC or other embedded system device. Additionally, this scheme accomplishes this task without the need for 'sticky' error bits and still works even if the system cannot be successfully reset or rebooted.

Removes all unrecoverable error functions from firmware, BIOS, and the operating system without sacrificing any error recovery functionality.

Removes any requirement for an SMI interrupt handler to spawn NMI interrupts as a means of halting the system after a fatal hardware error.

Fatal computer hardware errors are handled very reliably with no need for BIOS, system firmware, or interrupt handlers in the operating system to use sticky bits which retain their state through a system reboot. With the sticky bit approach, BIOS or firmware can inadvertently cause the failure again—because the BIOS/firmware has no idea what the nature of the failure is at the time of reboot and can run into the same unrecoverable error again.

Provides a complete replacement for BIOS/firmware and interrupt handler/operating system processing of fatal errors before reboot, a replacement that can handle any fatal hardware error that previously would have been handled prior to reboot by BIOS/firmware or interrupt handlers of the operating system—capable of addressing errors from anywhere in the computer system, not just parts of it.

Exemplary embodiments of the present invention are described largely in the context of a fully functional computer system for handling fatal computer hardware errors. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of handling fatal computer hardware errors, the computer comprising:

chips of a chipset, the chips of the chipset comprising principal integrated circuit components of a computer including one or more processors, one or more memory modules, and one or more bus adapters, the chips of the chipset communicatively connected through one or more in-band buses, the computer further comprising a programmable logic device communicatively coupled through at least one sideband bus to chips of the chipset and to an embedded system microcontroller,
the method comprising:
detecting, by a source chip of the chipset that is connected to an in-band bus that supports messaged interrupts, the occurrence of the fatal hardware error, including detecting a sync flood on the in-band bus;
halting data processing operations of the computer upon occurrence of a fatal hardware error;
signaling by the source chip of the chipset to the programmable logic device the occurrence of a fatal hardware error;
signaling by the programmable logic device to the embedded system microcontroller the occurrence of a fatal hardware error;
reading by the embedded system microcontroller through at least one sideband bus from registers in chips of the chipset information regarding the cause of the fatal hardware error; and
storing by the embedded system microcontroller the information in non-volatile random access memory of the embedded system microcontroller.

2. The method of claim 1 further comprising storing by the embedded system microcontroller in a system error log the information regarding the cause of the fatal hardware error.

3. The method of claim 1 further comprising rebooting the computer by the embedded system microcontroller.

4. The method of claim 1 further comprising determining by firmware of the computer system during reboot, in dependence upon the information regarding the cause of the fatal hardware error, whether the computer can successfully be returned to service after occurrence of a fatal hardware error.

5. The method of claim 1 wherein the source chip further comprises a HyperTransport bus adapter.

6. The method of claim 1 wherein:
the in-band bus is a bus for communication of computer program instructions and computer program data for execution of application programs among processors, memory, and other chips of the chipset; and
the sideband bus is a bus for service communications among peripheral service components of the computer and processors, memory, and other chips of the chipset.

7. The method of claim 1 wherein:
the at least one in-band bus comprises a HyperTransport bus; and
the at least one sideband bus comprises a Joint Test Action Group ('JTAG') bus and an Inter-Integrated Circuit ('I2C').

8. The method of claim 1 wherein the embedded system microcontroller is a Baseboard Management Controller ('BMC').

9. Apparatus for handling fatal computer hardware errors, the apparatus comprising:
chips of a chipset, the chips of the chipset comprising principal integrated circuit components of a computer including at least one computer processor, a computer memory operatively coupled to the computer processor, and at least one bus adapter, the chips of the chipset communicatively connected through one or more in-band buses,
the apparatus further comprising a programmable logic device that further comprises programmed logic, the programmable logic device communicatively coupled through at least one sideband bus to one or more chips of the chipset and to an embedded system microcontroller,
computer memory operatively coupled to the computer processor, computer memory comprises within the embedded system microcontroller,
the apparatus configured by circuitry and by computer program instructions in the computer memory to be capable of:
detecting, by a source chip of the chipset connected to an in-band bus that supports messaged interrupts, the occurrence of the fatal hardware error, including detecting a sync flood on the in-band bus;
halting data processing operations of the computer upon occurrence of a fatal hardware error;
signaling by the source chip of the chipset to the programmable logic device the occurrence of a fatal hard ware error;
signaling by the programmable logic device to the embedded system microcontroller the occurrence of a fatal hardware error;
reading by the embedded system microcontroller through at least one sideband bus from registers in chips of the chipset information regarding the cause of the fatal hardware error; and
storing by the embedded system microcontroller the information in non-volatile random access memory of the embedded system microcontroller.

10. The apparatus of claim 9 further comprising the apparatus configured by circuitry and by computer program instructions in the computer memory to be capable of storing by the embedded system microcontroller in a system error log the information regarding the cause of the fatal hardware error.

11. The apparatus of claim 9 further comprising the apparatus configured by circuitry and by computer program instructions in the computer memory to be capable of rebooting the computer system by the embedded system microcontroller.

12. The apparatus of claim 9 further comprising the apparatus configured by circuitry and by computer program instructions in the computer memory to be capable of determining by firmware of the computer system during reboot, in dependence upon the information regarding the cause of the fatal hardware error, whether the computer can successfully be returned to service after occurrence of a fatal hardware error.

13. The apparatus of claim 9 wherein the source chip further comprises a HyperTransport bus adapter.

14. The apparatus of claim 9 wherein:
the in-band bus is a bus for communication of computer program instructions and computer program data for execution of application programs among processors, memory, and chips of the chipset; and
the sideband bus is a bus for service communications among peripheral service components of the computer and processors, memory, and chips of the chipset.

15. The apparatus of claim 9 wherein:
the at least one in-band bus comprises a HyperTransport bus; and
the at least one sideband bus comprises a Joint Test Action Group ('JTAG') bus and an Inter-Integrated Circuit ('I2C').

16. The apparatus of claim 9 wherein the embedded system microcontroller is a Baseboard Management Controller ('BMC').

17. Apparatus for handling fatal computer hardware errors, the apparatus comprising:
chips of a chipset, the chips of the chipset comprising principal integrated circuit components of a computer, the chips of the chipset communicatively connected through in-band buses, the chips including at least one computer processor and at least one bus adapter, at least one chip of the chipset connected to an in-band bus that supports messaged interrupts, configured to detect the occurrence of a fatal hardware error by detecting a sync flood on the in-band bus, configured to halt data processing operations of the computer upon occurrence of a fatal hardware error and to signal a programmable logic device of the occurrence of a fatal hardware error;

a programmable logic device communicatively coupled through at least one sideband bus to one or more chips of the chipset and to an embedded system microcontroller, the programmable logic device configured to signal to the embedded microcontroller the occurrence of a fatal hardware error in response to receiving such a signal from a chip of the chipset; and an embedded system microcontroller connected through the programmable logic device and at least one sideband bus to chips of the chipset and configured to read from registers in chips of the chipset information regarding the cause of a fatal hardware error and to store the information in non-volatile random access memory of the embedded system microcontroller.

18. The apparatus of claim 17 wherein:

the in-band bus is a bus for communication of computer program instructions and computer program data for execution of application programs among processors, memory, and chips of the chipset; and the sideband bus is a bus for service communications among peripheral service components of the computer and processors, memory, and chips of the chipset.

19. The apparatus of claim 17 wherein the at least one chip of the chipset configured to signal a programmable logic device of the occurrence of a fatal hardware error further comprises a HyperTransport bus adapter.

20. The apparatus of claim 17 further comprising the embedded system microcontroller is configured to store in a system error log the information regarding the cause of a fatal hardware error.

21. The apparatus of claim 17 further comprising the embedded system microcontroller configured to rebooting the computer system.

22. The apparatus of claim 19 further comprising firmware of the computer configured to determine during reboot, in dependence upon the information regarding the cause of the fatal hardware error, whether the computer can successfully be returned to service after occurrence of a fatal hardware error.

23. The apparatus of claim 17 wherein:

the at least one in-band bus comprises a HyperTransport bus; and the at least one sideband bus comprises a Joint Test Action Group ('JTAG') bus and an Inter-Integrated Circuit ('I2C').

24. The apparatus of claim 19 wherein the embedded system microcontroller is a Baseboard Management Controller ('BDM').

* * * * *